United States Patent
Tada

[19]

[11] Patent Number: 6,056,555
[45] Date of Patent: May 2, 2000

[54] KARAOKE APPARATUS USING BACKGROUND VIDEO WITH VARIABLE REPRODUCTION ADDRESS

[75] Inventor: Yukio Tada, Hamamatsu, Japan

[73] Assignee: Yamaha Corporation, Hamamatsu, Japan

[21] Appl. No.: 09/103,648

[22] Filed: Jun. 23, 1998

[30] Foreign Application Priority Data

Jun. 24, 1997 [JP] Japan ................................... 9-166793

[51] Int. Cl.⁷ ............................... G09B 5/08; G10H 1/36; H04N 5/78
[52] U.S. Cl. ................................. 434/307 A; 434/307 R; 84/609; 84/610; 348/468
[58] Field of Search ................................ 434/307 R–309, 434/318, 365; 84/477 R, 609, 610, 625, 630, 631, 634, 645; 348/468, 488, 564, 571, 678; 381/81; 345/141, 143, 147

[56] References Cited

U.S. PATENT DOCUMENTS

| | | | |
|---|---|---|---|
| 5,247,126 | 9/1993 | Okamura et al. | 434/307 A |
| 5,583,577 | 12/1996 | Tsukagoshi | 348/468 |
| 5,611,693 | 3/1997 | Chaya et al. | 434/307 A |
| 5,631,433 | 5/1997 | Iida et al. | 84/610 |
| 5,683,253 | 11/1997 | Park et al. | 434/307 A |
| 5,726,373 | 3/1998 | Choi et al. | 84/609 |
| 5,863,206 | 1/1999 | Narusawa et al. | 434/307 A |

FOREIGN PATENT DOCUMENTS 6-124062  5/1994  Japan .................................. 434/307 A

*Primary Examiner*—Joe H. Cheng
*Attorney, Agent, or Firm*—Pillsbury Madison & Sutro LLP

[57] ABSTRACT

A karaoke apparatus is responsive to a request of a music piece for producing karaoke accompaniment to accompany a live singing voice of the music piece while reproducing a background video associated with the music piece. In the karaoke apparatus, a sound source device produces the karaoke accompaniment of the music piece in response to the request. A storage device stores video data representative of a piece of the background video which is associated with the music piece. The piece of the background video has a time length normally longer than a time length of the music piece. A central processing unit variably designates a read start point from which the piece of the background video should be reproduced. A drive device is responsive to the request for accessing the storage device to reproduce the background video from the read start point.

10 Claims, 4 Drawing Sheets

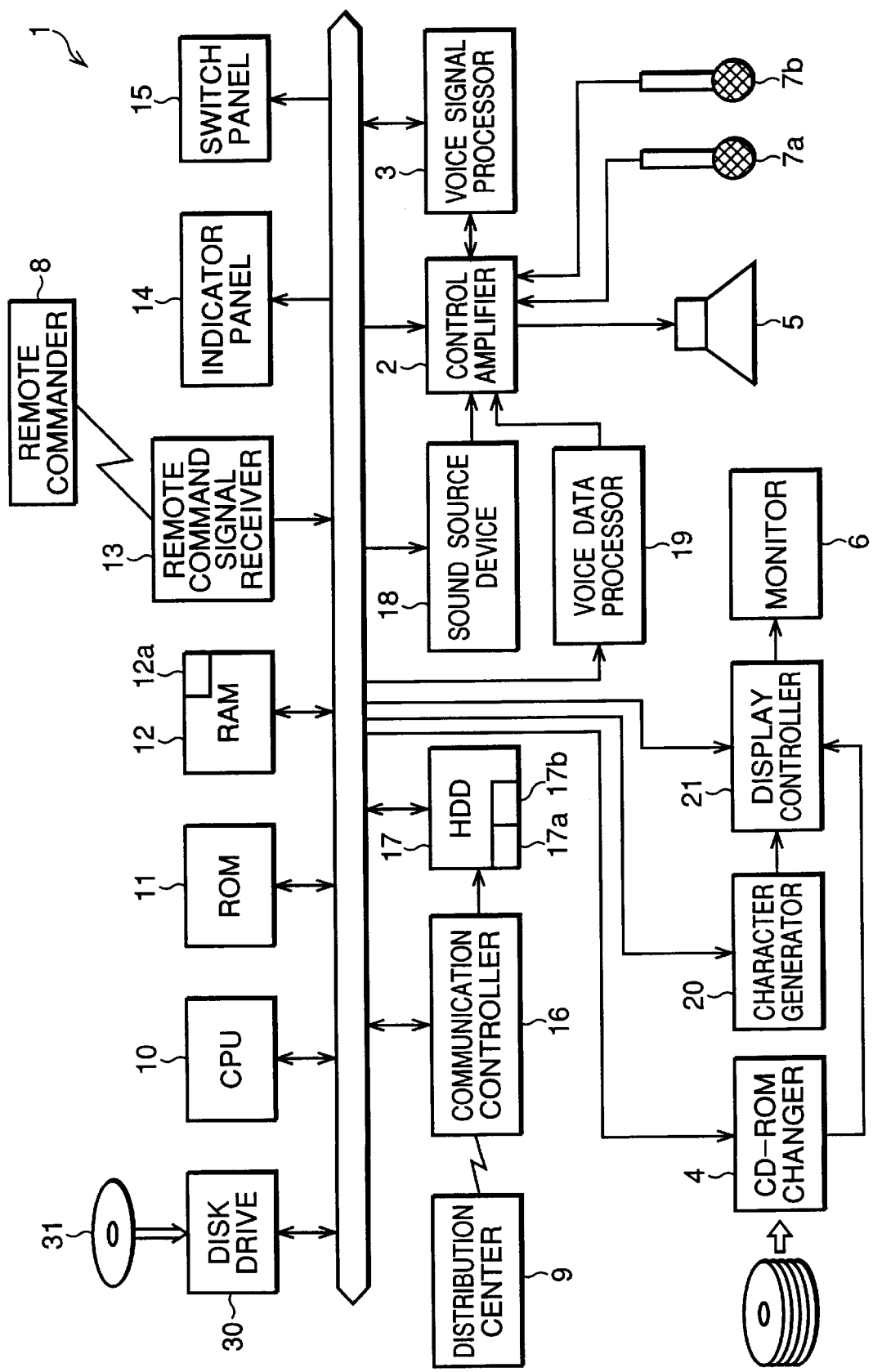

FIG.2(A)

| SONG NO. | DISK 1 SCENE NO. | DISK 2 SCENE NO. |
|---|---|---|
| SONG NO. | DISK 1 SCENE NO. | DISK 2 SCENE NO. |
| SONG NO. | DISK 1 SCENE NO. | DISK 2 SCENE NO. |
| ⋮ | ⋮ | ⋮ |
| SONG NO. | DISK 1 SCENE NO. | DISK 2 SCENE NO. |

FIG.2(B)

BGV DISK 1

| SCENE NO. | INTERMEDIATE TIME DATA |
|---|---|
| SCENE NO. | INTERMEDIATE TIME DATA |
| SCENE NO. | INTERMEDIATE TIME DATA |
| ⋮ | ⋮ |

BGV DISK 2

| SCENE NO. | INTERMEDIATE TIME DATA |
|---|---|
| SCENE NO. | INTERMEDIATE TIME DATA |
| SCENE NO. | INTERMEDIATE TIME DATA |
| ⋮ | ⋮ |

KARAOKE APPARATUS USING BACKGROUND VIDEO WITH VARIABLE REPRODUCTION ADDRESS

BACKGROUND OF THE INVENTION

1. Field of the Invention

The present invention generally relates to a karaoke apparatus for displaying a background video (BGV) that matches a music mood produced by a karaoke song being performed.

2. Description of Related Art

Karaoke apparatuses display a background video matching a karaoke song being performed in order to augment the mood of the song. In recently developed on-line karaoke apparatuses, song data for performing a song and video data for displaying the BGV of the song are separate from each other. According to a genre of a song to be performed, suitable video data is selected for reproduction of the background video. Storing plural pieces of video data for one song genre allows reproduction of a different BGV every time a different song of the same genre is performed.

A play time of most karaoke songs are shorter than five minutes. However, some medley songs last nearly ten minutes. Therefore, conventional video data for BGV is edited into a piece of video that continues about ten minutes to cover such a long song.

Actually, the karaoke apparatus stores only a limited number of background video pieces. Therefore, performing karaoke songs of the same genre multiple times may occasionally reproduce the piece of the same background video. Increasing BGV data lowers the chance of repetitive reproducing of the same BGV piece. However, this requires to increase the number of memory disks for storing the BGV data, leading to increased production cost and running cost.

In addition, conventional karaoke apparatuses reproduce video data always from its beginning or top point in synchronization with the start of a karaoke song. Therefore, in most songs lasting within five minutes, only the first half of the video data is reproduced, the second half being not fully used if the time length of one piece of the background video is ten minutes.

SUMMARY OF THE INVENTION

It is therefore an object of the present invention to provide a karaoke apparatus capable of reproducing a background video from a midpoint thereof, thereby imparting wide variation to reproduced video with relatively small amounts of video data and fully utilizing long video data.

In carrying out the invention, there is provided a karaoke apparatus comprising a sound source device or producing means for performing a karaoke song, a storage device or video data storage means for storing video data of the karaoke song, a central processing unit or reproduction start point designating means for determining a point at which the video data is to be reproduced, and a drive device or reproducing means for displaying a background video for the karaoke song by reproducing the video data from the reproduction start point determined by the reproducing start point designating means concurrently with performance of the karaoke song by the producing means.

In the above-mentioned novel constitution, a BGV is displayed in synchronization with performance of a karaoke song. In doing so, the reproducing start point designating means determines a start point of reproducing the video data for displaying the BGV. The video data starts to be reproduced at this point or position. The reproduction position can be set to a beginning or top point, a midpoint, and any other positions in the karaoke song. The reproduction start point designating means selects one of these read start points. Different read start points give one piece of background video different moods, thereby imparting wide or diverse variation to the display of the background video with relatively small amounts of video data. If the reproduction time of video data of a karaoke song is longer than the performance time of that karaoke song, the excess portion of the video would not be used in the conventional karaoke apparatus. The novel constitution allows this portion also to be used.

BRIEF DESCRIPTION OF THE DRAWINGS

These and other objects of the invention will be seen by reference to the description, taken in connection with the accompanying drawings, in which:

FIG. 1 is a block diagram illustrating a karaoke apparatus practiced as one preferred embodiment of the invention;

FIG. 2(A) is a diagram illustrating an index file stored in a hard disk of the above-mentioned preferred embodiment;

FIG. 2(B) is a diagram illustrating an intermediate time table stored in the above-mentioned hard disk;

DETAILED DESCRIPTION OF PREFERRED EMBODIMENTS

Figure 3:
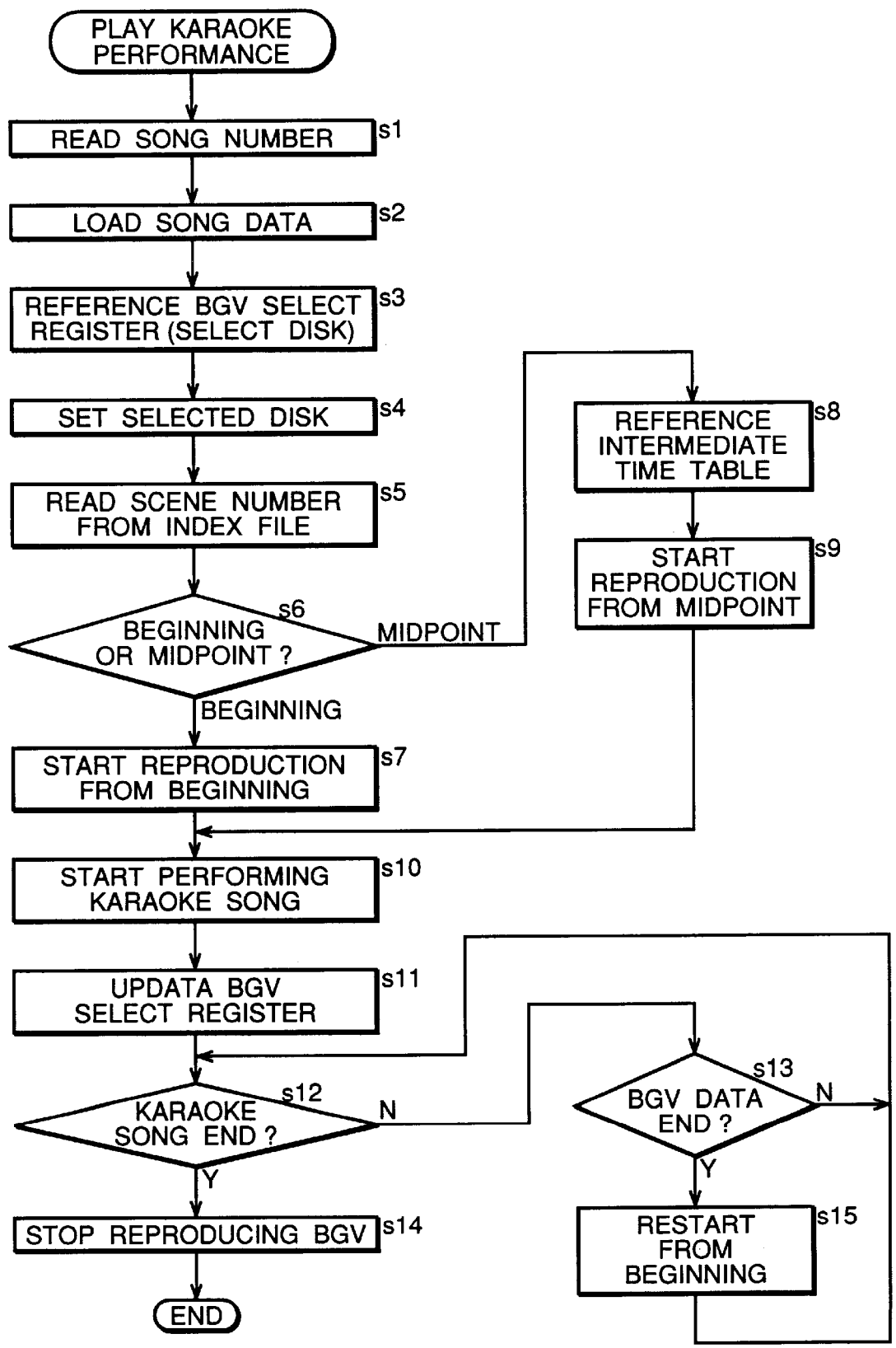
FIG. 3 is a flowchart indicative of a karaoke play operation of the above-mentioned preferred embodiment.

This invention will be described in further detail by way of example with reference to the accompanying drawings. Now referring to FIG. 1, there is shown a block diagram illustrating a karaoke apparatus practiced as one preferred embodiment of the invention. FIGS. 2(A) and 2(B) illustrate a format of video tables stored in a hard disk drive of this karaoke apparatus.

This karaoke apparatus plays a karaoke song requested by a user and displays a background video (BGV) along with the progression of the karaoke song. BGV data for reproducing a background video is motion picture data compressed according to MPEG (Motion Picture Experts Group) standard. The BGV data is recorded on plural video CDs (two in the present embodiment) in units of about a dozen of scenes. These video CDs are each accommodated in a cartridge, which is set in a CD-ROM changer 4.

The CD-ROM changer 4, which is an external device, can accommodate five plies of CD-ROMs. As instructed by a CPU 10, the CD-ROM changer 4 sets specified one of the accommodated CD-ROMs to a turntable to read karaoke data. Two of the five CD-ROMs are video CDs (BGV disk 1 and BGV disk 2) and the remaining three CD-ROMs store song data of standard karaoke songs. When performing song data stored in one of these CD-ROMs, the CD-ROM changer 4 first sets a corresponding CD-ROM for karaoke music to the turntable, and loads the song data into a hard disk drive 17 and a RAM 12. Then, the CD-ROM changer 4 sets a corresponding video CD for background video to the turntable to thereby execute total performance of a karaoke song based on the song data while reading the BGV data. When performing the song data initially stored in the hard disk drive 17, the CPU 10 loads this song data into the RAM 12, and then executes the karaoke performance while reproducing the video CD.

The BGV data to be reproduced is determined based on an index file and a BGV select register 12a (details to be described later). One piece of the BGV data is herein assumed to have a reproduction time length of about ten minutes in order to cope with a relatively long song such as a medley (a karaoke song in which a plural songs are joined into one piece). It should be noted that ordinary karaoke songs typically last about three to four minutes. Therefore, in this karaoke apparatus, one piece of BGV data is reproduced from its beginning point and midpoint alternately for effective use of the last half section of the video data.

As shown in FIG. 1, this karaoke apparatus comprises a main frame 1, a control amplifier 2, a voice signal processor 3, the CD-ROM changer 4, a loudspeaker 5, a monitor 6, microphones 7a and 7b, and an infrared remote commander 8. The main frame 1 controls the operation of the karaoke apparatus in its entirety. The CPU 10 is the controller of this karaoke apparatus main frame 1. The CPU 10 is connected through an internal bus to a ROM 11, the RAM 12, the hard disk drive 17, a communication controller 16, a remote command signal receiver 13, an indicator panel 14, a switch panel 15, a sound source device 18, a voice data processor 19, a character generator 20, and a display controller 21. The CPU 10 is also connected through an interface to the control amplifier 2, the voice signal processor 3, and the CD-ROM changer 4, which are external devices.

The ROM 11 stores a boot program and configuration data necessary for starting this karaoke apparatus. A system program for controlling the karaoke apparatus operation and a karaoke performance play program are stored in the hard disk drive 17. When the karaoke apparatus is powered on, the boot program loads the system program and the karaoke performance play program into the RAM 12. The RAM 12 has an area in which the programs are loaded from the hard disk drive 17 and another area in which song data of a selected song is loaded. In addition, the RAM 12 has an area defined with BGV select register 12a for indicating which background video is to be selected for the selected karaoke song. The BGV select register 12a will be described later.

The hard disk drive 17 has a song data storage area for storing song data of several thousand karaoke songs or music pieces, and a program storage area for storing the above-mentioned programs. The hard disk drive 17 further stores an index file 17a (refer to FIG. 2(A)) for indicating relationship between each piece of song data and each piece of BGV data, and stores an intermediate time table 17b (refer to FIG. 2(B)) listing time data about the midpoint of each piece of BGV data.

Referring to FIG. 2(A), the index file contains song numbers of the entry karaoke songs and corresponding BGV scene numbers selected from the BGV disk 1 and the BGV disk 2, one scene by one scene, based on the genre of the karaoke songs. This index file is updated automatically by on-line or manually by an operator every time new song data and BGV data are added.

Referring to FIG. 2(B), the intermediate time table contains intermediate time data of BGV scenes stored in the BGV disk 1 and the BGV disk 2. The time data is represented in a time from the beginning of the disk to the midpoint of a scene concerned. The midpoint is not set to a physically true midpoint but to an appropriate breakpoint approximately halfway through the scene. The intermediate time table is also updated every time a new BGV disk is loaded.

To reproduce a background video when performing a karaoke song, this karaoke apparatus determines which of the BGV disk 1 and the BGV disk 2 is to be selected for a target background video based on the contents of the above-mentioned BGV select register 12a. At the same time, the karaoke apparatus determines the read start point at which the selected BGV is to be reproduced, namely its beginning point or midpoint, based on the contents of the BGV select register 12a. To be more specific, the BGV select register 12a holds one of "1: beginning (the BGV data selected from the BGV disk 1 is reproduced from the beginning)," "2: beginning (the BGV data selected from the BGV disk 2 is reproduced from the beginning)," "1: intermediate (the BGV data selected from the BGV disk 1 is reproduced from the midpoint)," and "2: intermediate (the BGV data selected from the BGV disk 2 is reproduced from the midpoint)." Every time one karaoke song has been performed, the register contents are updated. For example, the register is updated cyclically from "1: beginning", "2: beginning", "1: intermediate", to "2: intermediate" every time one karaoke song has been performed.

Referring to FIG. 1 again, the communication controller 16 is connected through an ISDN (Integrated Services Digital Network) to a distribution center 9. From the distribution center 9, song data and the above-mentioned index file are downloaded. The downloaded data are stored in the hard disk drive 17. This storage operation is executed directly on the hard disk drive 17 through a DMA (Direct Memory Access) circuit.

The remote commander 8 has command keys such as numeric keys. When the user operates any of these keys, a corresponding code signal is outputted by means of infrared radiation. The remote command signal receiver 13 receives this infrared signal from the remote commander 8, decodes the code signal, and sends the resultant signal to the CPU 10. When a song number is inputted from the remote commander 8, the karaoke apparatus main frame 1 determines that the song number is a request and registers the received song number into a reservation list prepared in the RAM 12. When the song number is registered in the reservation list, the CPU 10 performs a karaoke song specified by this song number from the beginning of the song.

The indicator panel 14 is arranged on the front side of this karaoke apparatus main frame 1. The indicator panel 14 has a matrix indicator for displaying a currently performed song number and the number of reserved songs, and LEDs (Light Emitting Diodes) for displaying currently set music tune and tempo. The switch panel 15 has numeric keys for inputting a song number, a tune change switch, and tempo change switch generally similar to those arranged on the remote commander 8.

The sound source device 18 forms a music tone signal based on music tone track data included in the song data. The music tone track has plural sub tracks. Based on the data of these sub tracks, the sound source device 18 simultaneously generates music tone signals of plural parts. The voice signal processor 19 forms a voice signal having a specified length and a specified pitch based on voice data included in the song data. The voice data is a signal waveform of a background vocal that is difficult to be converted into a digital form, and therefore is stored as a sampled PCM signal. The tone signal formed by the sound source device 18 and the voice signal reproduced by the voice data processor 19 are inputted in the control amplifier 2. Two microphones 7a and 7b are connected to the control amplifier 2. Through these microphones, a singing voice signal of a karaoke singer is inputted. The control amplifier 2 imparts a specified effect such as echo to these audio signals, amplifies the effected signals, and outputs the amplified signals from the loudspeaker 5. The voice signal processor 3 digitally processes the singing voice signal inputted from the control amplifier 2 to correct an interval deviation, or to generate a harmony singing voice of another part. The corrected singing voice signal and the generated harmony singing voice signal are sent back to the control amplifier 2.

The character generator 20 generates a character pattern of lyric words of the karaoke song based on inputted character data contained in the song data. The BGV video data read from the CD-ROM changer 4 and decompressed from the MPEG-compressed state is also inputted in the display controller 21. The display controller 21 superimposes the character pattern of the lyric words inputted from the character generator 20 onto the BGV video for display on the monitor 6.

In the karaoke apparatus constituted as described above, when a request for a karaoke song is inputted by the user, the CPU 10 checks which of the hard disk drive 17 and the CD-ROM set in the CD-ROM changer 4 stores the song data of the request song. The CPU 10 reads the song data from the corresponding storage medium or storage device. Then, based on the index file and the contents of the BGV select register 12a, the CPU 10 determines which background video is to be reproduced in matching with the requested song. Then, the CPU 10 performs the karaoke song while reading the BGV data through the CD-ROM changer 4, which is a storage device and a drive device of the background video.

As described above, the inventive karaoke apparatus is responsive to a request of a music piece for producing karaoke accompaniment to accompany a live singing voice of the music piece while reproducing a background video associated with the music piece. In the karaoke apparatus, the sound source device 18 constitutes producing means for producing the karaoke accompaniment of the music piece in response to the request. The CD-ROM changer 4 constitutes storage means for storing video data representative of a piece of the background video which is associated with the music piece. The piece of the background video has a time length normally longer than a time length of the music piece. The CPU 10 constitutes designating means for variably designating a read start point from which the piece of the background video should be reproduced. The CD-ROM changer 4 further constitutes reproducing means responsive to the request for accessing the storage means to reproduce the background video from the read start point designated by the designating means.

Preferably, the designating means comprises means responsive to each request of each music piece for selecting each piece of background video associated with each music piece, and means for changing the read start point of the selected piece of the background video in response to each request.

Preferably, the designating means designates the read start point selected from a top point of the piece of the background video and an intermediate point of the piece of the background video. In such a case, the producing means operates if the music piece is not finished while the reproduction of the background video reaches an end point thereof after the reproduction of the background video has been started from the intermediate point for returning the background video to the top point so as to continue the reproduction of the background video.

Preferably, the designating means includes means operative when the music piece has the time length comparable to the time length of the piece of the background video for unconditionally designating the read start point to a top point of the piece of the background video.

Referring to FIG. 3, there is shown a flowchart indicative of a karaoke performance play operation of the above-mentioned karaoke apparatus. When a song number is inputted from the remote commander 8 for requesting a karaoke music piece, the CPU 10 detects the song number from the remote command signal receiver 13 (step s1). Then, the CPU 10 loads song data identified by this song number into the RAM 12 (step s2). If this song data is stored in the hard disk drive 17, the CPU 10 loads this song data directly from the hard disk drive 17 into the RAM 12. If the song data is stored in the CD-ROM, the CPU 10 sets this CD-ROM to the turntable of the CD-ROM changer 4, transfers the song data to the hard disk drive 17, and then loads the song data from the hard disk drive 17 into the RAM 12.

Next, the CPU 10 references the BGV select register 12a, determines which of the BGV disk 1 and the BGV disk 2 should be selected for reproducing the background video this time, and selects proper one of the CD-ROM disks (step s3). The CPU 10 sets the selected disk to the turntable of the CD-ROM changer (step s4). The CPU 10 searches the index file by the request song number and the disk number so as to read a corresponding scene (BGV data) (step s5). Then, the CPU 10 references the BGV select register 12a again to determine at which point the BGV data is to be reproduced; namely from the top point of the BGV data or the intermediate point thereof (step s6). If the reproduction from the top point or beginning is specified, the CPU 10 starts reproducing the background video from the beginning of the BGV data (step s7), thereby starting to perform the karaoke song (step s10). On the other hand, if the reproduction from the intermediate point or midpoint is specified, the CPU 10 references the intermediate time table by the selected scene number, thereby reading time data indicative of the reproduction start point (step s8). The CPU 10 starts reproduction from the indicated midpoint (step s9), thereby starting to perform the karaoke song (step s10). When performance of the karaoke song starts, the CPU 10 updates the BGV select register 12a (step s11). To be specific, the CPU 10 cyclically increments the BGV select register 12a in the order of "1: beginning", "2: beginning", "1: midpoint", and "2: midpoint." Subsequently, the CPU 10 continues the reproduction of the BGV video until the song ends. When the song comes to an end (step s12), the CPU 10 stops the reproduction of the background video (step s14). If the BGV data of the karaoke song that lasts more than five minutes is reproduced from a midpoint thereof, the BGV data may come to an end before the karaoke song is completely performed. If this happens (step s13), the CPU 10 returns to the beginning of the BGV data for continued reproduction (step s15). In this case, the last frame of the background video may be reproduced as a still picture until the BGV data is reproduced from the beginning thereof.

As described above, the inventive method produces karaoke accompaniment to accompany a live singing voice of a music piece in response to a request of the music piece while reproducing a background video associated with the music piece. The inventive method comprises the steps of storing video data representative of a piece of the background video which is associated with the music piece, the piece of the background video having a time length normally longer than a time length of the music piece, variably designating a read start point from which the piece of the background video should be reproduced, reading the video data to reproduce the background video from the read start point in response to the request of the music piece, and producing the karaoke accompaniment of the music piece in response to the request of the music piece concurrently with the reproduction of the background video. Preferably, the step of variably designating designates the read start point selected from a top point of the piece of the background video and an intermediate point of the piece of the background video.

Thus, according to the invention, a half of the background video to be reproduced concurrently with the performance of a karaoke song is one that starts from a midpoint of the background video, hence a variety of background video contents can be reproduced with limited number of data.

Figure 4:
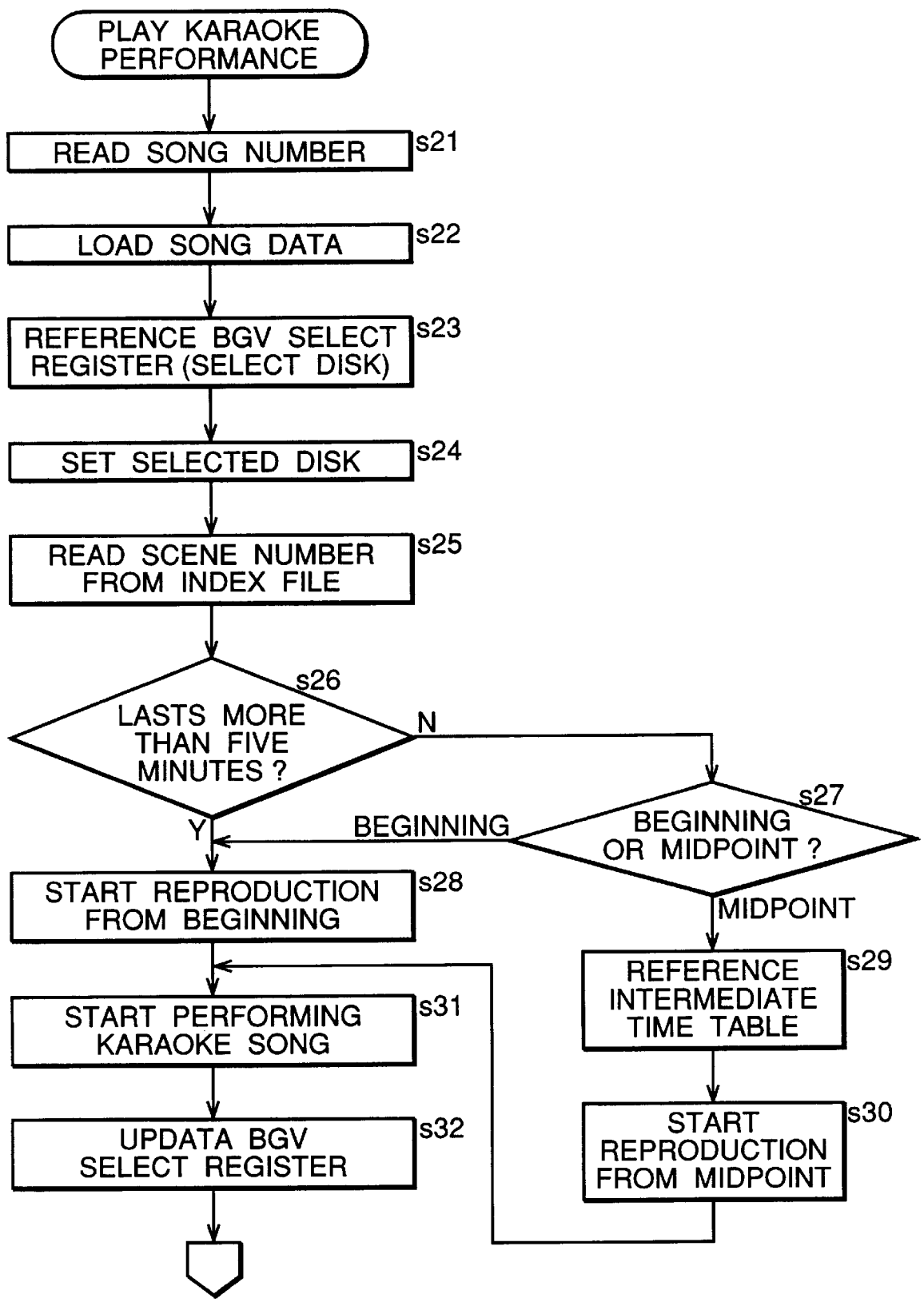
FIG. 4 is a flowchart indicative of another karaoke play operation of the above-mentioned preferred embodiment.

Referring to FIG. 4, there is shown a flowchart indicative of another example of the above-mentioned karaoke performance play operation. The operation of this example differs from the operation described above in that the CPU 10 determines before starting performance of a karaoke song whether the same lasts more than five minutes. If the song is found to last more than five minutes, the CPU 10 reproduces the BGV data of the song from the beginning regardless of the contents of the BGV select register 12a. In FIG. 4, when a karaoke song is requested, the CPU 10 reads the song number of this song from the remote command signal receiver 13 (step s21). The CPU 10 loads the song data identified by this song number into the RAM 12 (step s22). Then, the CPU 10 references the BGV select register 12a to select the BGV disk 1 or the BGV disk 2 from which the background video for this song is to be read (step s23). The CPU 10 sets the selected disk to the turntable of the CD-ROM changer 4 (step s24). The CPU 10 searches the index file by the request song number and the selected disk number to read a corresponding scene of the BGV (step s25). Then, the CPU 10 determines whether this karaoke song lasts more than five minutes as with a medley (step s26). If the karaoke song is found to last more than five minutes, the CPU 10 starts reproduction from the beginning of the BGV data regardless of the contents of the BGV select register 12a (step s28). On the other hand, if this karaoke song is found to last less than five minutes, the CPU 10 references the BGV select register 12a again to determine at which point this BGV is to be reproduced; namely the beginning or midpoint of the BGV data (step s27). If the reproduction from the beginning is specified, the CPU 10 starts reproducing the background video from the beginning of the BGV data. If the reproduction from the midpoint is specified, the CPU 10 references the intermediate time table by the selected scene number to read the time indicative of the reproduction start point (step s29). Then, the CPU 10 starts reproduction from the indicated midpoint (step s30), thereby starting performance of this karaoke song (step s31). When performance of the karaoke song starts, the CPU 10 updates the BGV select register 12a(step s32). To be more specific, the CPU 10 increments the contents of the BGV select register 12a cyclically in the order of "1: beginning", "2: beginning", "1: midpoint", and "2: midpoint." Subsequently, the CPU 10 continues reproduction of the background video until the karaoke song comes to an end. When the karaoke song ends, the CPU 10 stops reproducing the background video.

In the above-mentioned preferred embodiments, the reproduction is executed cyclically in the order of "1: beginning", "2: beginning", "1: midpoint", and "2: midpoint." Alternatively, the reproduction of the BGV can be executed cyclically in the order of "1: beginning", "1: midpoint", "2: beginning", and "2: midpoint", thereby changing the CD-ROMs only once at one cycle. It will be apparent that the number of CD-ROMs is not limited to two; the number may be three or more or only one. It will also be apparent that the medium storing the BGV data is not limited to the CD-ROM; it may be a DVD (Digital Versatile Disc) or a hard disk.

Further, the reproduction start points are not limited to the beginning and the midpoint. The number of alternatives is not limited to the two, the beginning and the midpoint. The number of alternatives may be set to three or more.

Moreover, the karaoke apparatus of FIG. 1 includes a disk drive 30 for receiving a machine readable medium 31 such as a floppy disk. 9. The machine readable medium 31 is for use in the karaoke apparatus having the CPU 10 and producing karaoke accompaniment to accompany a live singing voice of a music piece in response to a request of the music piece while reproducing a background video associated with the music piece. The medium 31 contains program instructions executable by the CPU 10 for causing the karaoke apparatus to perform the steps of storing video data representative of a piece of the background video which is associated with the music piece, the piece of the background video having a time length normally longer than a time length of the music piece, variably designating a read start point from which the piece of the background video should be reproduced, reading the video data to reproduce the background video from the read start point in response to the request of the music piece, and producing the karaoke accompaniment of the music piece in response to the request of the music piece concurrently with the reproduction of the background video.

As described and according to the invention, when displaying a background video concurrently with performance of a karaoke song, the display can be started from not only the beginning of the video data of the background video but also a midpoint of the video data, thereby imparting a wide variation to the contents of the background video display with a limited amount of video data. In addition, video data designed for a long karaoke song can be reproduced from a midpoint of the video data, thereby effectively utilizing the last half of the video data conventionally seldom reproduced.

While the preferred embodiments of the present invention have been described using specific terms, such description is for illustrative purposes only, and it is to be understood that changes and variations may be made without departing from the spirit or scope of the appended claims.

What is claimed is:

1. A karaoke apparatus responsive to a request of a music piece for producing karaoke accompaniment to accompany a live singing voice of the music piece while reproducing a background video associated with the music piece, the karaoke apparatus comprising:

a sound source device that produces the karaoke accompaniment of the music piece in response to the request;

a storage device that stores video data representative of a piece of the background video which is associated with the music piece, the piece of the background video having a time length normally longer than a time length of the music piece;

a central processing unit that variably designates a read start point from which the piece of the background video should be reproduced; and a drive device responsive to the request for accessing the storage device to reproduce the background video from the read start point.

2. A karaoke apparatus responsive to a request of a music piece for producing karaoke accompaniment to accompany a live singing voice of the music piece while reproducing a background video associated with the music piece, the karaoke apparatus comprising:

produing means for producing the karaoke accompaniment of the music piece in response to the request;

storage means for storing video data representative of a piece of the background video which is associated with the music piece, the piece of the background video having a time length normally longer than a time length of the music piece;

designating means for variably designating a read start point from which the piece of the background video should be reproduced; and reproducing means responsive to the request for accessing the storage means to reproduce the background video from the read start point designated by the designating means.

3. The karaoke apparatus according to claim 2, wherein the designating means comprises means responsive to each request of each music piece for selecting each piece of background video associated with each music piece, and means for changing the read start point of the selected piece of the background video in response to each request.

4. The karaoke apparatus according to claim 2, wherein the designating means designates the read start point selected from a top point of the piece of the background video and an intermediate point of the piece of the background video.

5. The karaoke apparatus according to claim 4, wherein the producing means operates if the music piece is not finished while the reproduction of the background video reaches an end point thereof after the reproduction of the background video has been started from the intermediate point for returning the background video to the top point so as to continue the reproduction of the background video.

6. The karaoke apparatus according to claim 2, wherein the designating means includes means operative when the music piece has the time length comparable to the time length of the piece of the background video for unconditionally designating the read start point to a top point of the piece of the background video.

7. A method of producing karaoke accompaniment to accompany a live singing voice of a music piece in response to a request of the music piece while reproducing a background video associated with the music piece, the method comprising the steps of:

storing video data representative of a piece of the background video which is associated with the music piece, the piece of the background video having a time length normally longer than a time length of the music piece;

variably designating a read start point from which the piece of the background video should be reproduced;

reading the video data to reproduce the background video from the read start point in response to the request of the music piece; and producing the karaoke accompaniment of the music piece in response to the request of the music piece concurrently with the reproduction of the background video.

8. The method according to claim 7, wherein the step of variably designating designates the read start point selected from a top point of the piece of the background video and an intermediate point of the piece of the background video.

9. A machine readable medium for use in a karaoke apparatus having a CPU and producing karaoke accompaniment to accompany a live singing voice of a music piece in response to a request of the music piece while reproducing a background video associated with the music piece, the medium containing program instructions executable by the CPU for causing the karaoke apparatus to perform the steps of:

storing video data representative of a piece of the background video which is associated with the music piece, the piece of the background video having a time length normally longer than a time length of the music piece;

variably designating a read start point from which the piece of the background video should be reproduced;

reading the video data to reproduce the background video from the read start point in response to the request of the music piece; and producing the karaoke accompaniment of the music piece in response to the request of the music piece concurrently with the reproduction of the background video.

10. The machine readable medium according to claim 9, wherein the step of variably designating designates the read start point selected from a top point of the piece of the background video and an intermediate point of the piece of the background video.

* * * * *